(12) United States Patent
Lee et al.

(10) Patent No.: US 9,726,257 B2
(45) Date of Patent: Aug. 8, 2017

(54) PLANETARY GEAR TRAIN OF AUTOMATIC TRANSMISSION FOR VEHICLES

(71) Applicant: Hyundai Motor Company, Seoul (KR)

(72) Inventors: KyeongHun Lee, Seoul (KR); Chang Wook Lee, Suwon-si (KR); JongSool Park, Hwaseong-si (KR); Sueng Ho Lee, Seoul (KR); Dong Hwan Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/923,762

(22) Filed: Oct. 27, 2015

(65) Prior Publication Data
US 2016/0327129 A1 Nov. 10, 2016

(30) Foreign Application Priority Data
May 6, 2015 (KR) .................. 10-2015-0063356

(51) Int. Cl.
*F16H 3/66* (2006.01)
(52) U.S. Cl.
CPC ....... *F16H 3/66* (2013.01); *F16H 2200/0069* (2013.01); *F16H 2200/2012* (2013.01); *F16H 2200/2048* (2013.01)
(58) Field of Classification Search
None
See application file for complete search history.

(56) References Cited

U.S. PATENT DOCUMENTS

| | | | |
|---|---|---|---|
| 8,915,819 B2 * | 12/2014 | Coffey | F16H 3/66 475/275 |
| 9,039,556 B2 * | 5/2015 | Borgerson | F02N 11/04 475/280 |
| 2012/0196718 A1 * | 8/2012 | Hart | F16H 3/66 475/271 |
| 2013/0072342 A1 * | 3/2013 | Shim | F16H 3/66 475/276 |
| 2013/0190127 A1 * | 7/2013 | Singh | F16H 3/66 475/276 |
| 2013/0203542 A1 * | 8/2013 | Garcia | F16H 3/66 475/71 |
| 2013/0203550 A1 * | 8/2013 | Mellet | F16H 3/66 475/276 |
| 2016/0327131 A1 * | 11/2016 | Lee | F16H 3/66 |

FOREIGN PATENT DOCUMENTS

| | | |
|---|---|---|
| JP | 2013-199959 A | 10/2013 |
| KR | 10-1283035 B1 | 7/2013 |
| KR | 10-2014-0046240 A | 4/2014 |
| KR | 10-1448789 B1 | 10/2014 |

* cited by examiner

*Primary Examiner* — Colby M Hansen
(74) *Attorney, Agent, or Firm* — Morgan Lewis & Bockius LLP

(57) ABSTRACT

A planetary gear train of an automatic transmission for vehicles may include an input shaft receiving power of an engine, an output shaft outputting shifted power of the engine, a first planetary gear set including first, second, and third rotating elements, a second planetary gear set including fourth, fifth, and sixth rotating elements, a third planetary gear set including seventh, eighth, and ninth rotating elements, a fourth planetary gear set including tenth, eleventh, and twelfth rotating elements, and seven control elements disposed between the rotating elements and at positions selectively connecting the rotating elements and a transmission housing.

20 Claims, 3 Drawing Sheets

FIG. 3

| | B1 | B2 | B3 | C1 | C2 | C3 | C4 | Gear ratio | Inter-stage ratio | Span of shift ratio |
|---|---|---|---|---|---|---|---|---|---|---|
| 1ST | | ● | ● | | | | ● | 4.815 | | 9.92 |
| 2ND | | | ● | | | ● | ● | 2.935 | 1.641 | |
| 3RD | | ● | ● | | | ● | | 2.104 | 1.395 | |
| 4TH | | | ● | | ● | ● | | 1.588 | 1.325 | |
| 5TH | | ● | | | ● | ● | | 1.209 | 1.313 | |
| 6TH | | | | | ● | ● | ● | 1.000 | 1.209 | |
| 7TH | | ● | | | ● | | ● | 0.854 | 1.171 | |
| 8TH | ● | | | ● | ● | | ● | 0.696 | 1.227 | |
| 9TH | ● | ● | | | ● | | | 0.586 | 1.188 | |
| 10TH | ● | ● | | | ● | | | 0.485 | 1.208 | |
| REV | ● | ● | ● | | | | | -4.755 | | |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2015-0063356 filed May 6, 2015, the entire contents of which is incorporated herein for all purposes by this reference.

BACKGROUND OF THE INVENTION

Field of the Invention

The present invention relates to an automatic transmission for vehicles, and more particularly, to a planetary gear train of an automatic transmission for vehicles capable of improving power delivery performance and fuel efficiency and securing linearity of an inter-stage ratio of a shift stage, by increasing a span of a shift ratio while implementing at least advance 10 speeds with a minimum configuration.

Description of Related Art

Recently, increasing oil prices have caused vehicle manufacturers all over the world to rush into infinite competition. Particularly in the case of engines, manufacturers have been pursuing efforts to reduce the weight and improve fuel efficiency of vehicles by reducing engine size, etc.

For this purpose, research into reduction of weight and enhancement of fuel efficiency through downsizing has been conducted in the case of an engine and research for simultaneously securing operability and fuel efficiency competitiveness through multiple speed stages of an automatic transmission has been conducted.

However, as the number of transmission speed stages of the automatic transmission increases, the number of internal components also increases, and as a result, the automatic transmission may be difficult to mount, the manufacturing cost and weight may be increased, and power transmission efficiency may be deteriorated.

Therefore, to increase the improvement effect of fuel efficiency by multi-staging, i.e., providing multiple speed stages, it is important to develop a planetary gear train which may lead maximum efficiency with a small number of parts.

In connection with this, an 8-speed automatic transmission tends to be implemented in recent and the research and development for a planetary gear train which may implement a shift stage higher than the 8-speed automatic transmission has been actively conducted.

However, the recent 8-speed automatic transmission maintains the span of the shift ratio at a level of 6.5 to 7.5, and therefore has a problem in that the improvement effect of fuel efficiency is not large.

Therefore, when the span of the shift ratio of the 8-speed automatic transmission is maintained at 9.0 or more, the linearity of the inter-stage ratio of the shift stage may not be secured, and as a result the driving efficiency of the engine and the drivability of vehicles are reduced. To cope with this, there is a need to develop a high-efficiency automatic transmission of 9 speeds or more.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for vehicles capable of improving power delivery performance and fuel efficiency and securing linearity of an inter-stage ratio of a shift stage, by increasing a span of a shift ratio while implementing at least advance 10 speeds and reverse 1 speed with a minimum configuration.

According to various aspects of the present invention, a planetary gear train of an automatic transmission for vehicles may include an input shaft receiving power of an engine, an output shaft outputting shifted power of the engine, a first planetary gear set including first, second, and third rotating elements, a second planetary gear set including fourth, fifth, and sixth rotating elements, a third planetary gear set including seventh, eighth, and ninth rotating elements, a fourth planetary gear set including tenth, eleventh, and twelfth rotating elements, and seven control elements disposed between the rotating elements and at positions selectively connecting the rotating elements and a transmission housing, in which the input shaft may be selectively connected to the twelfth rotating element simultaneously with being continuously connected to the fourth rotating element, the output shaft may be continuously connected to the eleventh rotating element, the eleventh rotating element may be continuously connected to the ninth rotating element, the eighth rotating element may be continuously connected to the twelfth rotating element, the seventh rotating element may be continuously connected to the third rotating element, the second rotating element may be continuously connected to the sixth rotating element, and at least ten advance speeds and at least one reverse speed may be implemented while three of the seven control elements are operated.

The fifth rotating element may be selectively connected to the transmission housing, the first rotating element may be selectively connected to the transmission housing, the tenth rotating element may be selectively connected to the transmission housing, the output shaft may be selectively connected to the first rotating element, and at least two of the fourth, fifth, and sixth rotating elements of the second planetary gear set may be selectively connected.

The first, second, and third rotating elements of the first planetary gear set may be a sun gear, a planetary carrier, and a ring gear, the fourth, fifth, and sixth rotating elements of the second planetary gear set may be a sun gear, a planetary carrier, and a ring gear, the seventh, eighth, and ninth rotating elements of the third planetary gear set may be a sun gear, a planetary carrier, and a ring gear, and the tenth, eleventh, and twelfth rotating elements of the fourth planetary gear set may be a sun gear, a planetary carrier, and a ring gear.

According to various aspects of the present invention, a planetary gear train of an automatic transmission for vehicles may include an input shaft receiving power of an engine, an output shaft outputting shifted power of the engine, a first planetary gear set including first, second, and third rotating elements, a second planetary gear set including fourth, fifth, and sixth rotating elements, a third planetary gear set including seventh, eighth, and ninth rotating elements, a fourth planetary gear set including tenth, eleventh, and twelfth rotating elements, and seven control elements disposed between the rotating elements and at positions selectively connecting between the rotating elements and a transmission housing, a first rotating shaft including the first rotating element and selectively connected to a transmission housing, a second rotating shaft including the second rotating element and the sixth rotating element, a third rotating shaft including the third rotating element and the seventh rotating element, a fourth rotating shaft including the fourth rotating element and directly connected to the input shaft, a fifth rotating shaft including the fifth rotating element and selectively connected to at least one of the second and fourth rotating shafts simultaneously with being selectively connected to the transmission housing, a sixth rotating shaft including the eighth rotating element and the twelfth rotating element and selectively connected to the fourth rotating shaft, a seventh rotating shaft including the ninth rotating element and the eleventh rotating element and directly connected to the output shaft simultaneously with being selectively connected to the first rotating shaft, and an eighth rotating shaft including the tenth rotating element and selectively connected to the transmission housing.

The first planetary gear set may be a single pinion planetary gear set and the first rotation element may be a first sun gear, the second rotation element may be a first planetary carrier, and the third rotation element may be a first ring gear, the second planetary gear set may be a single pinion planetary gear set and the fourth rotating element may be a second sun gear, the fifth rotating element may be a second planetary carrier, and the sixth rotating element comprises a second ring gear, the third planetary gear set may be a single pinion planetary gear set and the seventh rotating element may be a third sun gear, the eighth rotating element may be a third planetary carrier, and the ninth rotating element comprises a third ring gear, and the fourth planetary gear set may be a single pinion planetary gear set and the tenth rotating element may be a fourth sun gear, the eleventh rotating element may be a fourth planetary carrier, and the twelfth rotating element may be a fourth ring gear.

The seven control elements may include a first clutch selectively connecting the first rotating shaft and the seventh rotating shaft, a second clutch selectively connecting the fourth rotating shaft and the sixth rotating shaft, a third clutch selectively connecting the fourth rotating shaft and the fifth rotating shaft, a fourth clutch selectively connecting the third rotating shaft and the fifth rotating shaft, a first brake selectively connecting the fifth rotating shaft and the transmission housing, a second brake selectively connecting the first rotating shaft and the transmission housing, and a third brake selectively connecting the eighth rotating shaft and the transmission housing.

The seven control elements may include a first clutch selectively connecting the first rotating shaft and the seventh rotating shaft, a second clutch selectively connecting the fourth rotating shaft and the sixth rotating shaft, a third clutch selectively connecting the second rotating shaft and the fifth rotating shaft, a fourth clutch selectively connecting the third rotating shaft and the fifth rotating shaft, a first brake selectively connecting the fifth rotating shaft and the transmission housing, a second brake selectively connecting the first rotating shaft and the transmission housing, and a third brake selectively connecting the eighth rotating shaft and the transmission housing.

Shift stages implemented by selective operation of the seven control elements may include an advance first shift stage implemented by a simultaneous operation of the fourth clutch and the second and third brakes, an advance second shift stage implemented by a simultaneous operation of the third clutch, and the fourth clutch and the third brake, an advance third shift stage implemented by a simultaneous operation of the third clutch and the second and third brakes, an advance fourth shift stage implemented by a simultaneous operation of the second and third clutches and the third brake, an advance fifth shift stage implemented by a simultaneous operation of the second and third clutches and the second brake, an advance sixth shift stage implemented by a simultaneous operation of the second, third, and fourth clutches, an advance seventh shift stage implemented by a simultaneous operation of the second and fourth clutches and the second brake, an advance eighth shift stage implemented by a simultaneous operation of the second and fourth clutches and the first brake, an advance ninth shift stage implemented by a simultaneous operation of the second clutch and the first and second brakes, an advance tenth shift stage implemented by a simultaneous operation of the first and second clutches and the first brake, and a reverse shift stage implemented by a simultaneous operation of the first, second, and third brakes.

According to various aspects of the present invention, a planetary gear train of an automatic transmission for vehicles may include an input shaft receiving power of an engine, an output shaft outputting shifted power of the engine, a first planetary gear set including first, second, and third rotating elements, a second planetary gear set including fourth, fifth, and sixth rotating elements, a third planetary gear set including seventh, eighth, and ninth rotating elements, a fourth planetary gear set including tenth, eleventh, and twelfth rotating elements, a first rotating shaft including the first rotating element and selectively connected to a transmission housing, a second rotating shaft including the second rotating element and the sixth rotating element, a third rotating shaft including the third rotating element and the seventh rotating element, a fourth rotating shaft including the fourth rotating element and directly connected to the input shaft, a fifth rotating shaft including the fifth rotating element and selectively connected to the fourth rotating shaft simultaneously with being selectively connected to the transmission housing, a sixth rotating shaft including the eighth rotating element and the twelfth rotating element and selectively connected to the fourth rotating shaft, a seventh rotating shaft including the ninth rotating element and the eleventh rotating element and directly connected to the output shaft simultaneously with being selectively connected to the first rotating shaft, and an eighth rotating shaft including the tenth rotating element and selectively connected to a transmission housing, a first clutch selectively connecting the first rotating shaft and the seventh rotating shaft, a second clutch selectively connecting the fourth rotating shaft and the sixth rotating shaft, a third clutch selectively connecting the fourth rotating shaft and the fifth rotating shaft, a fourth clutch selectively connecting the third rotating shaft and the fifth rotating shaft, a first brake selectively connecting the fifth rotating shaft and the transmission housing, a second brake selectively connecting the first rotating shaft and the transmission housing, and a third brake selectively connecting the eighth rotating shaft and the transmission housing.

According to various aspects of the present invention, a planetary gear train of an automatic transmission for vehicles may include an input shaft applied with power of an engine, an output shaft outputting shifted power, a first planetary gear set including first, second, and third rotating elements, a second planetary gear set including fourth, fifth, and sixth rotating elements, a third planetary gear set including seventh, eighth, and ninth rotating elements, a fourth planetary gear set including tenth, eleventh, and twelfth rotating elements, a first rotating shaft including the first rotating element and selectively connected to a transmission housing, a second rotating shaft including the second rotating element and the sixth rotating element, a third rotating shaft including the third rotating element and the seventh rotating element, a fourth rotating shaft including the fourth rotating element and directly connected to the input shaft, a fifth rotating shaft including the fifth rotating element and selectively connected to the second rotating shaft simultaneously with being selectively connected to the transmission housing, a sixth rotating shaft including the eighth rotating element and the twelfth rotating element and selectively connected to the fourth rotating shaft, a seventh rotating shaft including the ninth rotating element and the eleventh rotating element and directly connected to the output shaft simultaneously with being selectively connected to the first rotating shaft, an eighth rotating shaft including the tenth rotating element and selectively connected to a transmission housing, a first clutch selectively connecting the first rotating shaft and the seventh rotating shaft, a second clutch selectively connecting the fourth rotating shaft and the sixth rotating shaft, a third clutch selectively connecting the second rotating shaft and the fifth rotating shaft, a fourth clutch selectively connecting the third rotating shaft and the fifth rotating shaft, a first brake selectively connecting the fifth rotating shaft and the transmission housing, a second brake selectively connecting the first rotating shaft and the transmission housing, and a third brake selectively connecting the eighth rotating shaft and the transmission housing.

According to various aspects of the present invention, a planetary gear train of an automatic transmission for vehicles may include an input shaft receiving power of an engine, an output shaft outputting shifted power of the engine, a first planetary gear set being a single pinion planetary gear set and including a first sun gear, a first planetary carrier, and a first ring gear, a second planetary gear set being the single pinion planetary gear set and including a second sun gear, a second planetary carrier, and a second ring gear, a third planetary gear set being the single pinion planetary gear set and including a third sun gear, a third planetary carrier, and a third ring gear, a fourth planetary gear set being the single pinion planetary gear set and including a fourth sun gear, a fourth planetary carrier, and a fourth ring gear, a first rotating shaft including the first sun gear and selectively connected to a transmission housing, a second rotating shaft including the first planetary carrier and the second ring gear, a third rotating shaft including the first ring gear and the third sun gear, a fourth rotating shaft including the second sun gear and directly connected to the input shaft, a fifth rotating shaft including the second planetary carrier and selectively connected to the fourth rotating shaft simultaneously with being selectively connected to the transmission housing, a sixth rotating shaft including the third planetary carrier and the fourth ring gear and selectively connected to the fourth rotating shaft, a seventh rotating shaft including the third ring gear and the fourth planetary carrier and directly connected to the output shaft simultaneously with being selectively connected to the first rotating shaft, an eighth rotating shaft including the fourth sun gear and selectively connected to a transmission housing, and seven control elements disposed between the rotating shafts and at positions selectively connecting the rotating shafts and the transmission housing.

According to various aspects of the present invention, a planetary gear train of an automatic transmission for vehicles may include an input shaft receiving power of an engine, an output shaft outputting shifted power of the engine, a first planetary gear set being a single pinion planetary gear set and including a first sun gear, a first planetary carrier, and a first ring gear, a second planetary gear set being the single pinion planetary gear set and including a second sun gear, a second planetary carrier, and a second ring gear, a third planetary gear set being the single pinion planetary gear set and including a third sun gear, a third planetary carrier, and a third ring gear, a fourth planetary gear set being the single pinion planetary gear set and including a fourth sun gear, a fourth planetary carrier, and a fourth ring gear, a first rotating shaft including the first sun gear and selectively connected to a transmission housing, a second rotating shaft including the first planetary carrier and the second ring gear, a third rotating shaft including the first ring gear and the third sun gear, a fourth rotating shaft including the second sun gear and directly connected to the input shaft, a fifth rotating shaft including the second planetary carrier and selectively connected to the second rotating shaft simultaneously with being selectively connected to the transmission housing, a sixth rotating shaft including the third planetary carrier and the fourth ring gear and selectively connected to the fourth rotating shaft, a seventh rotating shaft including the third ring gear and the fourth planetary carrier and directly connected to the output shaft simultaneously with being selectively connected to the first rotating shaft, an eighth rotating shaft including the fourth sun gear and selectively connected to a transmission housing, and seven control elements disposed between the rotating shafts and at positions selectively connecting the rotating shafts and the transmission housing.

According to various embodiments of the present invention, it is possible to implement at least 10 advance (i.e., forward) speed shift stage and 1 reverse speed shift stage by combining four planetary gear sets configured of the simple planetary gear set using 7 friction elements.

Further, it is possible to maximize the driving efficiency of the engine by securing the span of the shift ratio of 9.0 or more.

Further, it is possible to improve the drivability such as acceleration before and after shifting and engine speed rhythmical sense by implementing the high-efficiency multi-staging and securing the linearity of the inter-stage ratio of the shift stage.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is an operation table for each shift stage of each control element applied to the exemplary planetary gear trains according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
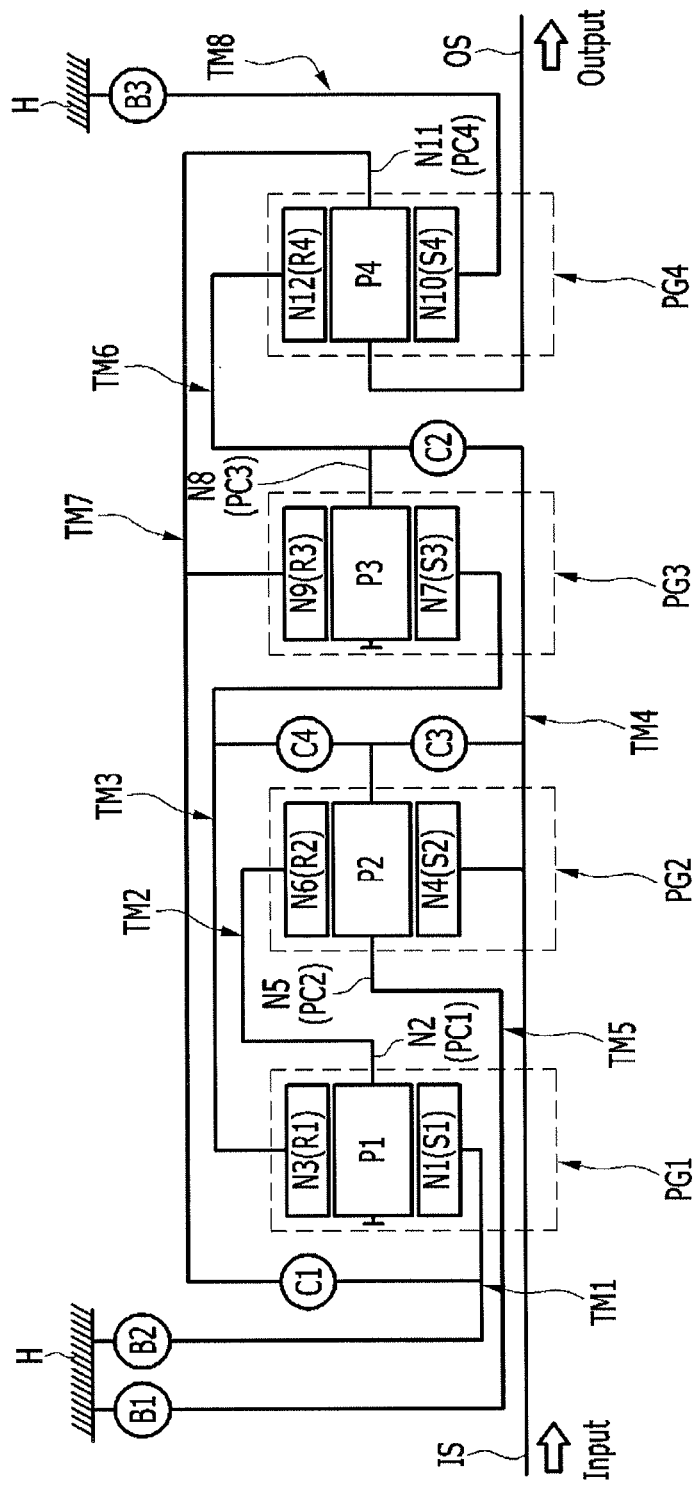
FIG. 1 is a configuration diagram of an exemplary planetary gear train according to the present invention.

FIG. 1 is a configuration diagram of a planetary gear train according to various embodiments of the present invention.

Referring to FIG. 1, a planetary gear train according to various embodiments of the present invention includes first, second, third, and fourth planetary gear sets PG1, PG2, PG3, and PG4 which are disposed on the same axis line, an input shaft IS, an output shaft OS, eight rotating shafts TM1 to TM8 which directly connect each of rotation elements of the first, second, third, fourth planetary gear sets PG1, PG2, PG3, and PG4 to each other, 7 friction elements C1 to C4 and B1 to B3, and a transmission housing H.

Further, rotating power input from the input shaft IS is shifted by a mutual supplement operation of the first, second, third, fourth planetary gear sets PG1, PG2, PG3, and PG4 and output through the output shaft OS.

Each simple planetary gear set is disposed in an order of the first, second, third, fourth planetary gear sets PG1, PG2, PG3, and PG4 from an engine side.

The input shaft IS is an input member and receives rotating power from a crank shaft of an engine while the rotating power is subjected to torque conversion by a torque converter.

The output shaft OS is an output member and is disposed on the same axis line as the input shaft IS to transfer the shifted driving torque to a drive shaft through a differential apparatus.

The first planetary gear set PG1 which is a single pinion planetary gear set is configured to include a first sun gear S1 which is a first rotating element N1, a first planetary carrier PC1 which is a second rotating element N2 supporting a first pinion P1 externally engaged with the first sun gear S1 which is the first rotating element N1, and a first ring gear R1 which is a third rotating element N3 internally engaged with the first pinion P1 as a rotating element.

The second planetary gear set PG2 is the single pinion planetary gear set and includes a second sun gear S2 which is a fourth rotating element N4, a second planetary carrier PC2 which is a fifth rotating element N5 supporting a second pinion P2 externally engaged with the second sun gear S2 which is the fourth rotating element N4, and a second ring gear R2 which is a sixth rotating element N6 internally engaged with the second pinion P2.

The third planetary gear set PG3 is the single pinion planetary gear set and includes a third sun gear S3 which is a seventh rotating element N7, a third planetary carrier PC3 which is an eighth rotating element supporting a third pinion P3 externally engaged with the third sun gear S3 which is the seventh rotating element, and a third ring gear R3 which is a ninth rotating element N9 internally engaged with the third pinion P3.

The fourth planetary gear set P is the single pinion planetary gear set and includes a fourth sun gear S4 which is a tenth rotating element N10, a fourth planetary carrier PC4 which is an eleventh rotating element N 11 supporting a fourth pinion P4 externally engaged with the fourth sun gear S4 which is the tenth rotating element N10, and a fourth ring gear R4 which is a twelfth rotating element N12 internally engaged with the fourth pinion P4.

The first, second, third, fourth planetary gear sets PG1, PG2, PG3, and PG4 are operated, holding a total of eight rotating shafts TM1 to TM8 while the second rotating element N2 is directly connected a sixth rotating element N6, the third rotating element N3 is directly connected to a seventh rotating element N7, the eighth rotating element N8 is directly connected to a twelfth rotating element N12, and the ninth rotating element N9 is directly connected to the eleventh rotating element N11.

A configuration of the eight rotating shafts TM1 to TM8 will be described as follows.

The first rotating shaft TM1 is configured to include the first rotating element N1 (first sun gear S1) and is selectively connected to a transmission housing H.

The second rotating shaft TM2 is configured to include the second rotating element N2 (first planetary carrier PC1) and the sixth rotating element N6 (second ring gear R2).

The third rotating shaft TM3 is configured to include the third rotating element N3 (first ring gear R1) and the eighth rotating element N7 (third sun gear S3).

The fourth rotating shaft TM4 is configured to include the fourth rotating element N4 (second sun gear S2) and is directly connected to the input shaft IS to be continuously operated as an input element.

The fifth rotating shaft TM5 is configured to include the fifth rotating element N5 (second planetary carrier PC2) and is selectively connected to any one of the second rotating shaft TM2 and the fourth rotating shaft TM3 simultaneously with being selectively connected to the transmission housing H.

The sixth rotating shaft TM6 is configured to include the eighth rotating element N8 (third planetary carrier PC3) and the twelfth rotating element N12 (fourth ring gear R4).

The seventh rotating shaft TM7 is configured to include the ninth rotating element N9 (third ring gear R3) and the eleventh rotating element N11 (fourth planetary carrier PC4) and is directly connected to the output shaft OS simultaneously with being selectively connected to the first rotating shaft TM1 to be operated as an output element.

The eighth rotating shaft TM8 is configured to include the tenth rotating element N10 (fourth sun gear S4) and is selectively connected to the transmission housing H.

Further, among the rotating shafts TM1 to TM8, a part selectively connected between the rotating shafts is provided with four clutches C1, C2, C3, and C4 which are control elements.

Further, among the rotating shafts TM1 to TM8, a part selectively connected to the transmission housing H is provided with three brakes B1, B2, and B3 which are control elements.

A disposition position of the seven control elements C1 to C4 and B1 to B3 will be described as follows.

The first clutch C1 is disposed between the first rotating shaft TM1 and the seventh rotating shaft TM7 and thus the first rotating shaft TM1 and the seventh rotating shaft TM7 are selectively integrated.

The second clutch C2 is disposed between the fourth rotating shaft TM4 and the sixth rotating shaft TM6 and thus the fourth rotating shaft TM4 and the sixth rotating shaft TM6 are selectively integrated.

The third clutch C3 is disposed between the fourth rotating shaft TM4 and the fifth rotating shaft TM5 and thus the fourth rotating shaft TM4 and the fifth rotating shaft TM5 are selectively integrated.

The fourth clutch C4 is disposed between the third rotating shaft TM3 and the fifth rotating shaft TM5 and thus the third rotating shaft TM3 and the fifth rotating shaft TM5 are selectively integrated.

The first brake B1 is disposed between the fifth rotating shaft TM5 and the transmission housing H and the fifth rotating shaft TM5 may be operated as a selective fixed element.

The second brake B2 is disposed between the first rotating shaft TM1 and the transmission housing H and thus the first rotating shaft TM1 may be operated as a selective fixed element.

The third brake B3 is disposed between the tenth rotating shaft TM10 and the transmission housing H and thus the tenth rotating shaft TM10 may be operated as a selective fixed element.

As described above, each of the control elements which include the first, second, third, and fourth clutches C1, C2, C3, and C4 and the first, second, and third brakes B1, B2, and B3 may be configured of a multi-plate type hydraulic friction coupling unit which is friction coupled by an oil pressure.

Figure 2:
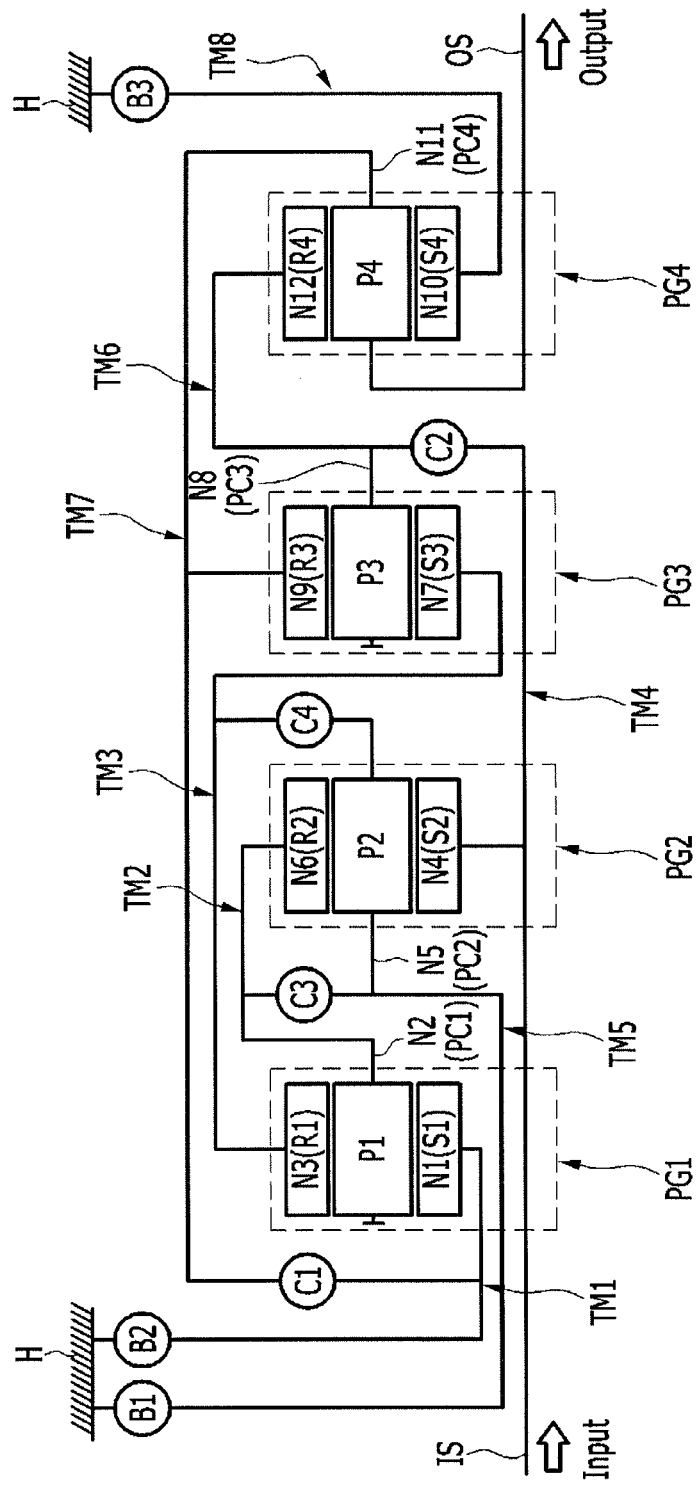
FIG. 2 is a configuration diagram of an exemplary planetary gear train according to the present invention.

FIG. 2 is a configuration diagram of a planetary gear train according to various embodiments of the present invention.

Referring to FIG. 2, in the planetary gear train according to the various embodiments of FIG. 1, the third clutch C3 is disposed between the fourth rotating shaft TM4 and the fifth rotating shaft TM5 but in the planetary gear train according to the various embodiments of FIG. 2, the third clutch C3 is disposed between the second rotating shaft TM2 and the fifth rotating shaft TM5.

That is, the third clutch C3 selectively connects two of the three rotating elements of the second planetary gear set PG2 to make the second planetary gear set PG2 be in a direct connection and in the various embodiments of the present invention, the disposition position thereof is different but a function thereof is the same.

FIG. 3 is an operation table for each shift stage of each control element applied to the planetary gear trains according to various embodiments of the present invention.

As illustrated in FIG. 3, the planetary gear train according to various embodiments of the present invention carries out shifting while three control elements are operated at each shift stage, in which the planetary gear train according to the various embodiments of FIG. 1 carries outs the shifting as follows.

The fourth clutch C4 and the second and third brakes B2 and B3 are simultaneously operated at an advance 1-speed shift stage 1ST. By doing so, an input is made through the fourth rotating shaft TM4 in the state in which the third rotating shaft TM3 and the fifth rotating shaft TM5 are connected to the fourth clutch C4 and advance 1-speed shifting is carried out and an output is made through the seventh rotating shaft TM7 while the first and eighth rotating shafts TM1 and TM8 are operated as the fixed element by the operation of the second and third brakes B2 and B3.

The third and fourth clutches C3 and C4 and the third brake B3 are simultaneously operated at an advance 2-speed shift stage 2ND. By doing so, an input is made through the fourth rotating shaft TM4 in the state in which the fourth rotating shaft TM4 and the fifth rotating shaft TM5 are connected to each other by the operation of the third clutch C3 and the third rotating shaft TM3 and the fifth rotating shaft TM5 are connected to each other by the operation of the fourth clutch C4 and advance 2-speed shifting is carried out and an output is made through the seventh rotating shaft TM7 while the eighth rotating shaft TM8 is operated as the fixed element by the operation of the third brake B3.

The third clutch C3 and the second and third brakes B2 and B3 are simultaneously operated at an advance 3-speed shift stage 3RD. By doing so, an input is made through the fourth rotating shaft TM4 in the state in which the fourth rotating shaft TM4 and the fifth rotating shaft TM5 are connected to each other by the operation of the third clutch C3 and advance 3-speed shifting is carried out and an output is made through the seventh rotating shaft TM7 while the first and eighth rotating shafts TM1 and TM8 are operated as the fixed element by the operation of the second and third brakes B2 and B3

The second and third clutches C2 and C3 and the third brake B3 are simultaneously operated at an advance 4-speed shift stage 4TH. By doing so, the input is made through the fourth rotating shaft TM4 in the state in which the fourth rotating shaft TM4 and the sixth rotating shaft TM6 are connected to each other by the operation of the second clutch C2 and the fourth rotating shaft TM4 and the fifth rotating shaft TM5 are connected to each other by the operation of the third clutch C3 and advance 4-speed shifting is carried out and an output is made through the seventh rotating shaft TM7 while the eighth rotating shaft TM8 is operated as the fixed element by the operation of the third brake B3.

The second and third clutches C1 and C3 and the second brake B2 are simultaneously operated at an advance 5-speed shift stage 5TH. By doing so, the input is made through the fourth rotating shaft TM4 in the state in which the fourth rotating shaft TM4 and the sixth rotating shaft TM6 are connected to each other by the operation of the second clutch C2 and the fourth rotating shaft TM4 and the fifth rotating shaft TM5 are connected to each other by the operation of the third clutch C3 and advance 5-speed shifting is carried out and an output is made through the seventh rotating shaft TM7 while the first rotating shaft TM1 is operated as the fixed element by the operation of the second brake B2.

The second, third, and fourth clutches C2, C3, and C4 are simultaneously operated at an advance 6-speed shift stage 6TH. By doing so, all the planetary gear sets are in the direct connection state and advance 6-speed shifting which output an original input is carried out while the fourth rotating shaft TM4 and the sixth rotating shaft TM6 are connected to each other by the operation of the second clutch C2, the fourth rotating shaft TM4 and the fifth rotating shaft TM5 are connected to each other by the operation of the third clutch C3, and the third rotating shaft TM3 and the fifth rotating shaft TM5 are connected to each other by the operation of the fourth clutch C4.

The second and fourth clutches C2 and C4 and the second brake B2 are simultaneously operated at an advance 7-speed shift stage 7TH. By doing so, the input is made through the fourth rotating shaft TM4 in the state in which the fourth rotating shaft TM4 and the sixth rotating shaft TM6 are connected to each other by the operation of the second clutch C2 and the third rotating shaft TM3 and the fifth rotating shaft TM5 are connected to each other by the operation of the fourth clutch C4 and advance 7-speed shifting is carried out and an output is made through the seventh rotating shaft TM7 while the first rotating shaft TM1 is operated as the fixed element by the operation of the second brake B2.

The second and fourth clutches C2 and C4 and the first brake B1 are simultaneously operated at an advance 8-speed shift stage 8TH. By doing so, the input is made through the fourth rotating shaft TM4 in the state in which the fourth rotating shaft TM4 and the sixth rotating shaft TM6 are connected to each other by the operation of the second clutch C2 and the third rotating shaft TM3 and the fifth rotating shaft TM5 are connected to each other by the operation of the fourth clutch C4 and advance 8-speed shifting is carried out and an output is made through the seventh rotating shaft TM7 while the fifth rotating shaft TM5 and the third rotating shaft TM3 are operated as the fixed element by the operation of the first brake B1 and the fourth clutch C4.

The second clutch C2 and the first and second brakes B1 and B2 are simultaneously operated at an advance 9-speed shift stage 9TH. By doing so, an input is made through the fourth rotating shaft TM4 in the state in which the fourth rotating shaft TM4 and the sixth rotating shaft TM6 are connected to each other by the operation of the second clutch C2 and advance 9-speed shifting is carried out and an output is made through the seventh rotating shaft TM7 while the fifth and first rotating shafts TM5 and TM1 are operated as the fixed element by the operation of the first and second brakes B1 and B2

The first and second clutches C1 and C2 and the first brake B1 are simultaneously operated at an advance 10-speed shift stage 10TH. By doing so, an input is made through the fourth rotating shaft TM4 in the state in which the first rotating shaft TM1 and the seventh rotating shaft TM7 are connected to each other by the operation of the first clutch C1 and the fourth rotating shaft TM4 and the sixth rotating shaft TM6 are connected to each other by the operation of the second clutch C2 and advance 10-speed shifting is carried out and an output is made through the seventh rotating shaft TM7 while the fifth rotating shaft TM5 is operated as the fixed element by the operation of the first brake B1.

The first, second, and third brakes B1, B2, and B3 are simultaneously operated at a reverse shift stage REV. By doing so, the reverse shifting is made and an output is made through the seventh rotating shaft TM7 while the fifth, first, and eighth rotating shafts TM5, TM1, and TM8 are operated as the fixed elements by the operation of the first, second, and third brakes B1, B2, and B3 in the state in which an input is made through the fourth input shaft TM4.

Further, the planetary gear train according to the various embodiments of FIG. 2 carries out shifting as follows since the third clutch C3 is disposed differently from the various embodiments of FIG. 1.

The fourth clutch C4 and the second and third brakes B2 and B3 are simultaneously operated at an advance 1-speed shift stage 1ST. By doing so, an input is made through the fourth rotating shaft TM4 in the state in which the third rotating shaft TM3 and the fifth rotating shaft TM5 are connected to the fourth clutch C4 and advance 1-speed shifting is carried out and an output is made through the seventh rotating shaft TM7 while the first and eighth rotating shafts TM1 and TM8 are operated as the fixed element by the operation of the second and third brakes B2 and B3.

The third and fourth clutches C3 and C4 and the third brake B3 are simultaneously operated at an advance 2-speed shift stage 2ND. By doing so, an input is made through the fourth rotating shaft TM4 in the state in which the second rotating shaft TM2 and the fifth rotating shaft TM5 are connected to each other by the operation of the third clutch C3 and the third rotating shaft TM3 and the fifth rotating shaft TM5 are connected to each other by the operation of the fourth clutch C4 and advance 2-speed shifting is carried out and an output is made through the seventh rotating shaft TM7 while the eighth rotating shaft TM8 is operated as the fixed element by the operation of the third brake B3.

The third clutch C3 and the second and third brakes B2 and B3 are simultaneously operated at an advance 3-speed shift stage 3RD. By doing so, an input is made through the fourth rotating shaft TM4 in the state in which the second rotating shaft TM2 and the fifth rotating shaft TM5 are connected to each other by the operation of the third clutch C3 and advance 3-speed shifting is carried out and an output is made through the seventh rotating shaft TM7 while the first and eighth rotating shafts TM1 and TM8 are operated as the fixed element by the operation of the second and third brakes B2 and B3

The second and third clutches C2 and C3 and the third brake B3 are simultaneously operated at an advance 4-speed shift stage 4TH. By doing so, the input is made through the fourth rotating shaft TM4 in the state in which the fourth rotating shaft TM4 and the sixth rotating shaft TM6 are connected to each other by the operation of the second clutch C2 and the second rotating shaft TM2 and the fifth rotating shaft TM5 are connected to each other by the operation of the third clutch C3 and advance 4-speed shifting is carried out and an output is made through the seventh rotating shaft TM7 while the eighth rotating shaft TM8 is operated as the fixed element by the operation of the third brake B3.

The second and third clutches C1 and C3 and the second brake B2 are simultaneously operated at an advance 5-speed shift stage 5TH. By doing so, the input is made through the fourth rotating shaft TM4 in the state in which the fourth rotating shaft TM4 and the sixth rotating shaft TM6 are connected to each other by the operation of the second clutch C2 and the second rotating shaft TM2 and the fifth rotating shaft TM5 are connected to each other by the operation of the third clutch C3 and advance 5-speed shifting is carried out and an output is made through the seventh rotating shaft TM7 while the first rotating shaft TM1 is operated as the fixed element by the operation of the second brake B2.

The second, third, and fourth clutches C2, C3, and C4 are simultaneously operated at an advance 6-speed shift stage 6TH. By doing so, all the planetary gear sets are in the direct connection state and advance 6-speed shifting which output an original input is carried out while the fourth rotating shaft TM4 and the sixth rotating shaft TM6 are connected to each other by the operation of the second clutch C2, the second rotating shaft TM2 and the fifth rotating shaft TM5 are connected to each other by the operation of the third clutch C3, and the third rotating shaft TM3 and the fifth rotating shaft TM5 are connected to each other by the operation of the fourth clutch C4.

The second and fourth clutches C2 and C4 and the second brake B2 are simultaneously operated at an advance 7-speed shift stage 7TH. By doing so, the input is made through the fourth rotating shaft TM4 in the state in which the fourth rotating shaft TM4 and the sixth rotating shaft TM6 are connected to each other by the operation of the second clutch C2 and the third rotating shaft TM3 and the fifth rotating shaft TM5 are connected to each other by the operation of the fourth clutch C4 and advance 7-speed shifting is carried out and an output is made through the seventh rotating shaft TM7 while the first rotating shaft TM1 is operated as the fixed element by the operation of the second brake B2.

The second and fourth clutches C2 and C4 and the first brake B1 are simultaneously operated at an advance 8-speed shift stage 8TH. By doing so, the input is made through the fourth rotating shaft TM4 in the state in which the fourth rotating shaft TM4 and the sixth rotating shaft TM6 are connected to each other by the operation of the second clutch C2 and the third rotating shaft TM3 and the fifth rotating shaft TM5 are connected to each other by the operation of the fourth clutch C4 and advance 8-speed shifting is carried out and an output is made through the seventh rotating shaft TM7 while the fifth rotating shaft TM5 and the third rotating shaft TM3 are operated as the fixed element by the operation of the first brake B1 and the fourth clutch C4.

The second clutch C2 and the first and second brakes B1 and B2 are simultaneously operated at an advance 9-speed shift stage 9TH. By doing so, an input is made through the fourth rotating shaft TM4 in the state in which the fourth rotating shaft TM4 and the sixth rotating shaft TM6 are connected to each other by the operation of the second clutch C2 and advance 9-speed shifting is carried out and an output is made through the seventh rotating shaft TM7 while the fifth and first rotating shafts TM5 and TM1 are operated as the fixed element by the operation of the first and second brakes B1 and B2

The first and second clutches C1 and C2 and the first brake B1 are simultaneously operated at an advance 10-speed shift stage 10TH. By doing so, an input is made through the fourth rotating shaft TM4 in the state in which the first rotating shaft TM1 and the seventh rotating shaft TM7 are connected to each other by the operation of the first clutch C1 and the fourth rotating shaft TM4 and the sixth rotating shaft TM6 are connected to each other by the operation of the second clutch C2 and advance 10-speed shifting is carried out and an output is made through the seventh rotating shaft TM7 while the fifth rotating shaft TM5 is operated as the fixed element by the operation of the first brake B1.

The first, second, and third brakes B1, B2, and B3 are simultaneously operated at the reverse shift stage REV. By doing so, the reverse shifting is made and an output is made through the seventh rotating shaft TM7 while the fifth, first, and eighth rotating shafts TM5, TM1, and TM8 are operated as the fixed elements by the operation of the first, second, and third brakes B1, B2, and B3 in the state in which an input is made through the fourth input shaft TM4.

As described above, the planetary gear train according to various embodiments of the present invention may realize the advance 10-speed shift stage and the reverse 1-speed shift stage by performing the operation control of the fourth clutches C1, C2, C3, and C4 and the three brakes B1, B2, and B3 on the fourth planetary gear sets PG1, PG2, PG3, and PG4.

Further, it is possible to improve the drivability such as acceleration before and after shifting and engine speed rhythmical sense by securing the linearity while all the inter-stage ratios other than advance 6/7 and 8/9 shift stages are 1.2 or more Further, it is possible to maximize the driving efficiency of the engine by securing the span of the shift ratio of 9.0 or more.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for vehicles, comprising:
   an input shaft receiving power of an engine;
   an output shaft outputting shifted power of the engine;
   a first planetary gear set including first, second, and third rotating elements;
   a second planetary gear set including fourth, fifth, and sixth rotating elements;
   a third planetary gear set including seventh, eighth, and ninth rotating elements;
   a fourth planetary gear set including tenth, eleventh, and twelfth rotating elements; and
   seven control elements disposed between the rotating elements and at positions selectively connecting the rotating elements and a transmission housing,
   wherein the input shaft is selectively connected to the twelfth rotating element simultaneously with being continuously connected to the fourth rotating element,
   the output shaft is continuously connected to the eleventh rotating element,
   the eleventh rotating element is continuously connected to the ninth rotating element,
   the eighth rotating element is continuously connected to the twelfth rotating element,
   the seventh rotating element is continuously connected to the third rotating element,
   the second rotating element is continuously connected to the sixth rotating element, and
   at least ten advance speeds and at least one reverse speed are implemented while three of the seven control elements are operated.

2. The planetary gear train of claim 1, wherein:
   the fifth rotating element is selectively connected to the transmission housing,
   the first rotating element is selectively connected to the transmission housing,
   the tenth rotating element is selectively connected to the transmission housing,
   the output shaft is selectively connected to the first rotating element, and
   at least two of the fourth, fifth, and sixth rotating elements of the second planetary gear set are selectively connected.

3. The planetary gear train of claim 1, wherein:
   the first, second, and third rotating elements of the first planetary gear set are a sun gear, a planetary carrier, and a ring gear,
   the fourth, fifth, and sixth rotating elements of the second planetary gear set are a sun gear, a planetary carrier, and a ring gear,
   the seventh, eighth, and ninth rotating elements of the third planetary gear set are a sun gear, a planetary carrier, and a ring gear, and
   the tenth, eleventh, and twelfth rotating elements of the fourth planetary gear set are a sun gear, a planetary carrier, and a ring gear.

4. A planetary gear train of an automatic transmission for vehicles, comprising:
   an input shaft receiving power of an engine;
   an output shaft outputting shifted power of the engine;

a first planetary gear set including first, second, and third rotating elements;
a second planetary gear set including fourth, fifth, and sixth rotating elements;
a third planetary gear set including seventh, eighth, and ninth rotating elements;
a fourth planetary gear set including tenth, eleventh, and twelfth rotating elements; and
seven control elements disposed between the rotating elements and at positions selectively connecting between the rotating elements and a transmission housing;
a first rotating shaft including the first rotating element and selectively connected to a transmission housing;
a second rotating shaft including the second rotating element and the sixth rotating element;
a third rotating shaft including the third rotating element and the seventh rotating element;
a fourth rotating shaft including the fourth rotating element and directly connected to the input shaft;
a fifth rotating shaft including the fifth rotating element and selectively connected to at least one of the second and fourth rotating shafts simultaneously with being selectively connected to the transmission housing;
a sixth rotating shaft including the eighth rotating element and the twelfth rotating element and selectively connected to the fourth rotating shaft;
a seventh rotating shaft including the ninth rotating element and the eleventh rotating element and directly connected to the output shaft simultaneously with being selectively connected to the first rotating shaft; and
an eighth rotating shaft including the tenth rotating element and selectively connected to the transmission housing.

5. The planetary gear train of claim 4, wherein:
the first planetary gear set is a single pinion planetary gear set and the first rotation element comprises a first sun gear, the second rotation element comprises a first planetary carrier, and the third rotation element comprises a first ring gear,
the second planetary gear set is a single pinion planetary gear set and the fourth rotating element comprises a second sun gear, the fifth rotating element comprises a second planetary carrier, and the sixth rotating element comprises a second ring gear,
the third planetary gear set is a single pinion planetary gear set and the seventh rotating element comprises a third sun gear, the eighth rotating element comprises a third planetary carrier, and the ninth rotating element comprises a third ring gear, and
the fourth planetary gear set is a single pinion planetary gear set and the tenth rotating element comprises a fourth sun gear, the eleventh rotating element comprises a fourth planetary carrier, and the twelfth rotating element comprises a fourth ring gear.

6. The planetary gear train of claim 4, wherein the seven control elements include:
a first clutch selectively connecting the first rotating shaft and the seventh rotating shaft;
a second clutch selectively connecting the fourth rotating shaft and the sixth rotating shaft;
a third clutch selectively connecting the fourth rotating shaft and the fifth rotating shaft;
a fourth clutch selectively connecting the third rotating shaft and the fifth rotating shaft;
a first brake selectively connecting the fifth rotating shaft and the transmission housing;
a second brake selectively connecting the first rotating shaft and the transmission housing; and
a third brake selectively connecting the eighth rotating shaft and the transmission housing.

7. The planetary gear train of claim 6, wherein shift stages implemented by selective operation of the seven control elements include:
an advance first shift stage implemented by a simultaneous operation of the fourth clutch and the second and third brakes;
an advance second shift stage implemented by a simultaneous operation of the third clutch, and the fourth clutch and the third brake;
an advance third shift stage implemented by a simultaneous operation of the third clutch and the second and third brakes;
an advance fourth shift stage implemented by a simultaneous operation of the second and third clutches and the third brake;
an advance fifth shift stage implemented by a simultaneous operation of the second and third clutches and the second brake;
an advance sixth shift stage implemented by a simultaneous operation of the second, third, and fourth clutches;
an advance seventh shift stage implemented by a simultaneous operation of the second and fourth clutches and the second brake;
an advance eighth shift stage implemented by a simultaneous operation of the second and fourth clutches and the first brake;
an advance ninth shift stage implemented by a simultaneous operation of the second clutch and the first and second brakes;
an advance tenth shift stage implemented by a simultaneous operation of the first and second clutches and the first brake; and
a reverse shift stage implemented by a simultaneous operation of the first, second, and third brakes.

8. The planetary gear train of claim 4, wherein the seven control elements include:
a first clutch selectively connecting the first rotating shaft and the seventh rotating shaft;
a second clutch selectively connecting the fourth rotating shaft and the sixth rotating shaft;
a third clutch selectively connecting the second rotating shaft and the fifth rotating shaft;
a fourth clutch selectively connecting the third rotating shaft and the fifth rotating shaft;
a first brake selectively connecting the fifth rotating shaft and the transmission housing;
a second brake selectively connecting the first rotating shaft and the transmission housing; and
a third brake selectively connecting the eighth rotating shaft and the transmission housing.

9. A planetary gear train of an automatic transmission for vehicles, comprising:
an input shaft receiving power of an engine;
an output shaft outputting shifted power of the engine;
a first planetary gear set including first, second, and third rotating elements;
a second planetary gear set including fourth, fifth, and sixth rotating elements;
a third planetary gear set including seventh, eighth, and ninth rotating elements;

a fourth planetary gear set including tenth, eleventh, and twelfth rotating elements;
a first rotating shaft including the first rotating element and selectively connected to a transmission housing;
a second rotating shaft including the second rotating element and the sixth rotating element;
a third rotating shaft including the third rotating element and the seventh rotating element;
a fourth rotating shaft including the fourth rotating element and directly connected to the input shaft;
a fifth rotating shaft including the fifth rotating element and selectively connected to the fourth rotating shaft simultaneously with being selectively connected to the transmission housing;
a sixth rotating shaft including the eighth rotating element and the twelfth rotating element and selectively connected to the fourth rotating shaft;
a seventh rotating shaft including the ninth rotating element and the eleventh rotating element and directly connected to the output shaft simultaneously with being selectively connected to the first rotating shaft; and
an eighth rotating shaft including the tenth rotating element and selectively connected to a transmission housing;
a first clutch selectively connecting the first rotating shaft and the seventh rotating shaft;
a second clutch selectively connecting the fourth rotating shaft and the sixth rotating shaft;
a third clutch selectively connecting the fourth rotating shaft and the fifth rotating shaft;
a fourth clutch selectively connecting the third rotating shaft and the fifth rotating shaft;
a first brake selectively connecting the fifth rotating shaft and the transmission housing;
a second brake selectively connecting the first rotating shaft and the transmission housing; and
a third brake selectively connecting the eighth rotating shaft and the transmission housing.

10. The planetary gear train of claim 9, wherein:
the first planetary gear set is a single pinion planetary gear set and the first rotation element comprises a first sun gear, the second rotation element comprises a first planetary carrier, and the third rotation element comprises a first ring gear,
the second planetary gear set is the single pinion planetary gear set and the fourth rotating element comprises a second sun gear, the fifth rotating element comprises a second planetary carrier, and the sixth rotating element comprises a second ring gear,
the third planetary gear set is the single pinion planetary gear set and the seventh rotating element comprises a third sun gear, the eighth rotating element comprises a third planetary carrier, and the ninth rotating element comprises a third ring gear, and
the fourth planetary gear set is the single pinion planetary gear set and the tenth rotating element comprises a fourth sun gear, the eleventh rotating element comprises a fourth planetary carrier, and the twelfth rotating element comprises a fourth ring gear.

11. The planetary gear train of claim 9, wherein shift stages implemented by a selective operation of the first, second, third, and fourth clutches and the first, second, and third brakes include:
an advance first shift stage implemented by a simultaneous operation of the fourth clutch and the second and third brakes;
an advance second shift stage implemented by a simultaneous operation of the third clutch, and the fourth clutch and the third brake;
an advance third shift stage implemented by a simultaneous operation of the third clutch and the second and third brakes;
an advance fourth shift stage implemented by a simultaneous operation of the second and third clutches and the third brake;
an advance fifth shift stage implemented by a simultaneous operation of the second and third clutches and the second brake;
an advance sixth shift stage implemented by a simultaneous operation of the second, third, and fourth clutches;
an advance seventh shift stage implemented by a simultaneous operation of the second and fourth clutches and the second brake;
an advance eighth shift stage implemented by a simultaneous operation of the second and fourth clutches and the first brake;
an advance ninth shift stage implemented by a simultaneous operation of the second clutch and the first and second brakes;
an advance tenth shift stage implemented by a simultaneous operation of the first and second clutches and the first brake; and
a reverse shift stage implemented by a simultaneous operation of the first, second, and third brakes.

12. A planetary gear train of an automatic transmission for vehicles, comprising:
an input shaft applied with power of an engine;
an output shaft outputting shifted power;
a first planetary gear set including first, second, and third rotating elements;
a second planetary gear set including fourth, fifth, and sixth rotating elements;
a third planetary gear set including seventh, eighth, and ninth rotating elements;
a fourth planetary gear set including tenth, eleventh, and twelfth rotating elements;
a first rotating shaft including the first rotating element and selectively connected to a transmission housing;
a second rotating shaft including the second rotating element and the sixth rotating element;
a third rotating shaft including the third rotating element and the seventh rotating element;
a fourth rotating shaft including the fourth rotating element and directly connected to the input shaft;
a fifth rotating shaft including the fifth rotating element and selectively connected to the second rotating shaft simultaneously with being selectively connected to the transmission housing;
a sixth rotating shaft including the eighth rotating element and the twelfth rotating element and selectively connected to the fourth rotating shaft;
a seventh rotating shaft including the ninth rotating element and the eleventh rotating element and directly connected to the output shaft simultaneously with being selectively connected to the first rotating shaft; and
an eighth rotating shaft including the tenth rotating element and selectively connected to a transmission housing;
a first clutch selectively connecting the first rotating shaft and the seventh rotating shaft;

a second clutch selectively connecting the fourth rotating shaft and the sixth rotating shaft;
a third clutch selectively connecting the second rotating shaft and the fifth rotating shaft;
a fourth clutch selectively connecting the third rotating shaft and the fifth rotating shaft;
a first brake selectively connecting the fifth rotating shaft and the transmission housing;
a second brake selectively connecting the first rotating shaft and the transmission housing; and
a third brake selectively connecting the eighth rotating shaft and the transmission housing.

13. The planetary gear train of claim 12, wherein:
the first planetary gear set is a single pinion planetary gear set and the first rotation element comprises a first sun gear, the second rotation element comprises a first planetary carrier, and the third rotation element comprises a first ring gear,
the second planetary gear set is the single pinion planetary gear set and the fourth rotating element comprises a second sun gear, the fifth rotating element comprises a second planetary carrier, and the sixth rotating element comprises a second ring gear,
the third planetary gear set is the single pinion planetary gear set and the seventh rotating element comprises a third sun gear, the eighth rotating element comprises a third planetary carrier, and the ninth rotating element comprises a third ring gear, and
the fourth planetary gear set is the single pinion planetary gear set and the tenth rotating element comprises a fourth sun gear, the eleventh rotating element comprises a fourth planetary carrier, and the twelfth rotating element comprises a fourth ring gear.

14. The planetary gear train of claim 12, wherein shift stages implemented by a selective operation of the first, second, third, and fourth clutches and the first, second, and third brakes include:
an advance first shift stage implemented by a simultaneous operation of the fourth clutch and the second and third brakes;
an advance second shift stage implemented by a simultaneous operation of the third clutch, and the fourth clutch and the third brake;
an advance third shift stage implemented by a simultaneous operation of the third clutch and the second and third brakes;
an advance fourth shift stage implemented by a simultaneous operation of the second and third clutches and the third brake;
an advance fifth shift stage implemented by a simultaneous operation of the second and third clutches and the second brake;
an advance sixth shift stage implemented by a simultaneous operation of the second, third, and fourth clutches;
an advance seventh shift stage implemented by a simultaneous operation of the second and fourth clutches and the second brake;
an advance eighth shift stage implemented by a simultaneous operation of the second and fourth clutches and the first brake;
an advance ninth shift stage implemented by a simultaneous operation of the second clutch and the first and second brakes;
an advance tenth shift stage implemented by a simultaneous operation of the first and second clutches and the first brake; and
a reverse shift stage implemented by a simultaneous operation of the first, second, and third brakes.

15. A planetary gear train of an automatic transmission for vehicles, comprising:
an input shaft receiving power of an engine;
an output shaft outputting shifted power of the engine;
a first planetary gear set being a single pinion planetary gear set and including a first sun gear, a first planetary carrier, and a first ring gear;
a second planetary gear set being the single pinion planetary gear set and including a second sun gear, a second planetary carrier, and a second ring gear;
a third planetary gear set being the single pinion planetary gear set and including a third sun gear, a third planetary carrier, and a third ring gear;
a fourth planetary gear set being the single pinion planetary gear set and including a fourth sun gear, a fourth planetary carrier, and a fourth ring gear;
a first rotating shaft including the first sun gear and selectively connected to a transmission housing;
a second rotating shaft including the first planetary carrier and the second ring gear;
a third rotating shaft including the first ring gear and the third sun gear;
a fourth rotating shaft including the second sun gear and directly connected to the input shaft;
a fifth rotating shaft including the second planetary carrier and selectively connected to the fourth rotating shaft simultaneously with being selectively connected to the transmission housing;
a sixth rotating shaft including the third planetary carrier and the fourth ring gear and selectively connected to the fourth rotating shaft;
a seventh rotating shaft including the third ring gear and the fourth planetary carrier and directly connected to the output shaft simultaneously with being selectively connected to the first rotating shaft;
an eighth rotating shaft including the fourth sun gear and selectively connected to a transmission housing; and
seven control elements disposed between the rotating shafts and at positions selectively connecting the rotating shafts and the transmission housing.

16. The planetary gear train of claim 15, wherein the seven control elements include:
a first clutch selectively connecting the first rotating shaft and the seventh rotating shaft;
a second clutch selectively connecting the fourth rotating shaft and the sixth rotating shaft;
a third clutch selectively connecting the fourth rotating shaft and the fifth rotating shaft;
a fourth clutch selectively connecting the third rotating shaft and the fifth rotating shaft;
a first brake selectively connecting the fifth rotating shaft and the transmission housing;
a second brake selectively connecting the first rotating shaft and the transmission housing; and
a third brake selectively connecting the eighth rotating shaft and the transmission housing.

17. The planetary gear train of claim 16, wherein shift stages implemented by selective operation of the seven control elements include:
an advance first shift stage implemented by a simultaneous operation of the fourth clutch and the second and third brakes;
an advance second shift stage implemented by a simultaneous operation of the third clutch, and the fourth clutch and the third brake;

an advance third shift stage implemented by a simultaneous operation of the third clutch and the second and third brakes;

an advance fourth shift stage implemented by a simultaneous operation of the second and third clutches and the third brake;

an advance fifth shift stage implemented by a simultaneous operation of the second and third clutches and the second brake;

an advance sixth shift stage implemented by a simultaneous operation of the second, third, and fourth clutches;

an advance seventh shift stage implemented by a simultaneous operation of the second and fourth clutches and the second brake;

an advance eighth shift stage implemented by a simultaneous operation of the second and fourth clutches and the first brake;

an advance ninth shift stage implemented by a simultaneous operation of the second clutch and the first and second brakes;

an advance tenth shift stage implemented by a simultaneous operation of the first and second clutches and the first brake; and a reverse shift stage implemented by a simultaneous operation of the first, second, and third brakes.

18. A planetary gear train of an automatic transmission for vehicles, comprising:

an input shaft receiving power of an engine;

an output shaft outputting shifted power of the engine;

a first planetary gear set being a single pinion planetary gear set and including a first sun gear, a first planetary carrier, and a first ring gear;

a second planetary gear set being the single pinion planetary gear set and including a second sun gear, a second planetary carrier, and a second ring gear;

a third planetary gear set being the single pinion planetary gear set and including a third sun gear, a third planetary carrier, and a third ring gear;

a fourth planetary gear set being the single pinion planetary gear set and including a fourth sun gear, a fourth planetary carrier, and a fourth ring gear;

a first rotating shaft including the first sun gear and selectively connected to a transmission housing;

a second rotating shaft including the first planetary carrier and the second ring gear;

a third rotating shaft including the first ring gear and the third sun gear;

a fourth rotating shaft including the second sun gear and directly connected to the input shaft;

a fifth rotating shaft including the second planetary carrier and selectively connected to the second rotating shaft simultaneously with being selectively connected to the transmission housing;

a sixth rotating shaft including the third planetary carrier and the fourth ring gear and selectively connected to the fourth rotating shaft;

a seventh rotating shaft including the third ring gear and the fourth planetary carrier and directly connected to the output shaft simultaneously with being selectively connected to the first rotating shaft;

an eighth rotating shaft including the fourth sun gear and selectively connected to a transmission housing; and seven control elements disposed between the rotating shafts and at positions selectively connecting the rotating shafts and the transmission housing.

19. The planetary gear train of claim 18, wherein the seven control elements include:

a first clutch selectively connecting the first rotating shaft and the seventh rotating shaft;

a second clutch selectively connecting the fourth rotating shaft and the sixth rotating shaft;

a third clutch selectively connecting the second rotating shaft and the fifth rotating shaft;

a fourth clutch selectively connecting the third rotating shaft and the fifth rotating shaft;

a first brake selectively connecting the fifth rotating shaft and the transmission housing;

a second brake selectively connecting the first rotating shaft and the transmission housing; and a third brake selectively connecting the eighth rotating shaft and the transmission housing.

20. The planetary gear train of claim 19, wherein shift stages implemented by selective operation of the seven control elements include:

an advance first shift stage implemented by a simultaneous operation of the fourth clutch and the second and third brakes;

an advance second shift stage implemented by a simultaneous operation of the third clutch, and the fourth clutch and the third brake;

an advance third shift stage implemented by a simultaneous operation of the third clutch and the second and third brakes;

an advance fourth shift stage implemented by a simultaneous operation of the second and third clutches and the third brake;

an advance fifth shift stage implemented by a simultaneous operation of the second and third clutches and the second brake;

an advance sixth shift stage implemented by a simultaneous operation of the second, third, and fourth clutches;

an advance seventh shift stage implemented by a simultaneous operation of the second and fourth clutches and the second brake;

an advance eighth shift stage implemented by a simultaneous operation of the second and fourth clutches and the first brake;

an advance ninth shift stage implemented by a simultaneous operation of the second clutch and the first and second brakes;

an advance tenth shift stage implemented by a simultaneous operation of the first and second clutches and the first brake; and a reverse shift stage implemented by a simultaneous operation of the first, second, and third brakes.

\* \* \* \* \*